United States Patent [19]
Motomura

[11] Patent Number: 5,467,318
[45] Date of Patent: Nov. 14, 1995

[54] ADDRESS GENERATING AND DECODING APPARATUS WITH HIGH OPERATION SPEED

[75] Inventor: Masato Motomura, Tokyo, Japan

[73] Assignee: NEC Corporation

[21] Appl. No.: 359,733

[22] Filed: Dec. 20, 1994

[30] Foreign Application Priority Data

Dec. 28, 1993 [JP] Japan ................................. 5-333973

[51] Int. Cl.[6] ................................................ G11C 13/00
[52] U.S. Cl. ................................. 365/230.06; 365/230.01
[58] Field of Search ........................ 365/230.01, 230.06, 365/189.01, 230.07, 189.04

[56] References Cited

U.S. PATENT DOCUMENTS 5,193,071  3/1993  Umina et al. ..................... 365/189.01

Primary Examiner—Terrell W. Fears
Attorney, Agent, or Firm—Young & Thompson

[57] ABSTRACT

In an apparatus for adding first and second addresses to generate a third address and decoding the third address to generate a plurality of partial decoding signals, a plurality of partial decoding signal generating units, each for generating one of the partial decoding signals, are connected in parallel. Each of the partial decoding signal generating units includes an adder for adding a part of the first address to a part of the second address, a carry look ahead circuit, a decoder for decoding the output of the adder, and a shifter for shifting the partial decoding signal of the decoder. A carry output signal of one of the partial decoding signal generating units on the downstream side is supplied to the carry look ahead circuit and the shifter of another of the partial decoding signal generating units on the upstream side.

6 Claims, 5 Drawing Sheets

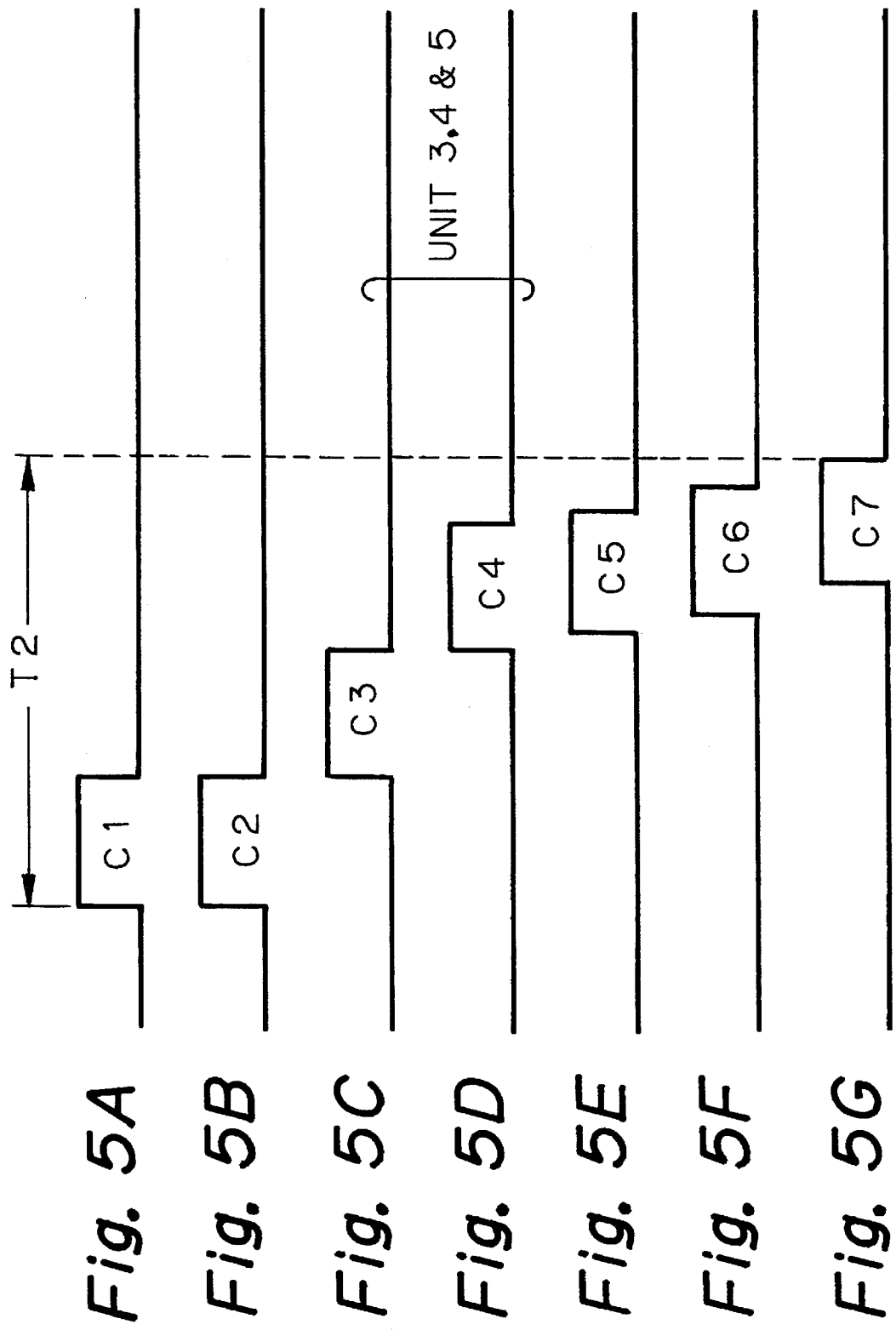

1

ADDRESS GENERATING AND DECODING APPARATUS WITH HIGH OPERATION SPEED

BACKGROUND OF THE INVENTION

1. Field of the Invention

The present invention relates to an address generating and decoding apparatus included in a microprocessor, a digital signal processor and the like.

2. Description of the Related Art

In a microprocessor, a digital signal processor and the like, when accessing a memory storage unit (MSU), a memory address needs to be calculated. Generally, such a memory address is generated by the addition of two addresses such as a base address and a displacement. Also, the memory address is decoded by a decoder to generate a decoding signal for the MSU.

A prior art address generating and decoding apparatus uses a partial address generating and decoding method. That is, a plurality of partial decoding signal generating units, each for generating one of the partial decoding signals, are connected in parallel. Also, each of the partial decoding signal generating units includes an adder, for adding a part of a first address to a part of a second address, a carry look ahead circuit, and a decoder for decoding the output of the adder. A carry output signal of one of the partial decoding signal generating units on the downstream side is supplied to the adder and the carry look ahead circuit of another of the partial decoding signal generating units on the upstream side. This will be explained later in detail.

In the above-mentioned prior art address generating and decoding apparatus, however, a carry signal is propagated through the adders of the partial decoding signal generating units and each adder carries out an addition operation using the carry signal from the partial decoding signal generating units on the downstream side in addition to the first and second addresses. In other words, the operation of the partial decoding signal generating units on the upstream side is reduced in comparison to that of the partial decoding signal generating units on the downstream side, thus reducing the operation speed of the entire apparatus.

SUMMARY OF THE INVENTION

It is an object of the present invention to provide an address generating and decoding apparatus with a high operation speed.

According to the present invention, in an apparatus for adding first and second addresses to generate a third address and decoding the third address to generate a plurality of partial decoding signals, a plurality of partial decoding signal generating units, each for generating one of the partial decoding signals, are connected in parallel. Also, each of the partial decoding signal generating units includes an adder for adding a part of the first address to a part of the second address, a carry look ahead circuit, a decoder for decoding the output of the adder, and a shifter for shifting the partial decoding signal of the decoder. A carry output signal of one of the partial decoding signal generating units on the downstream side is supplied to the carry look ahead circuit and the shifter of another of the partial decoding signal generating units on the upstream side.

Thus, since all of the adders and all of the decoders can be operated without the carry signals, all of the adders can be operated simultaneously, and all of the decoders can be operated simultaneously. In other words, all of the partial decoding signal generating units except for the shifters can be operated simultaneously.

BRIEF DESCRIPTION OF THE DRAWINGS

The present invention will be more clearly understood from the description as set forth below, with reference to the accompanying drawings, wherein:

FIGS. 5A through 5G are timing diagrams showing the operation of the apparatus of FIG. 3.

DESCRIPTION OF THE PREFERRED EMBODIMENT

Before the description of the preferred embodiment, a prior art address generating and decoding apparatus will be explained with reference to FIG. 1 and FIGS. 2A through 2H.

Figure 1:
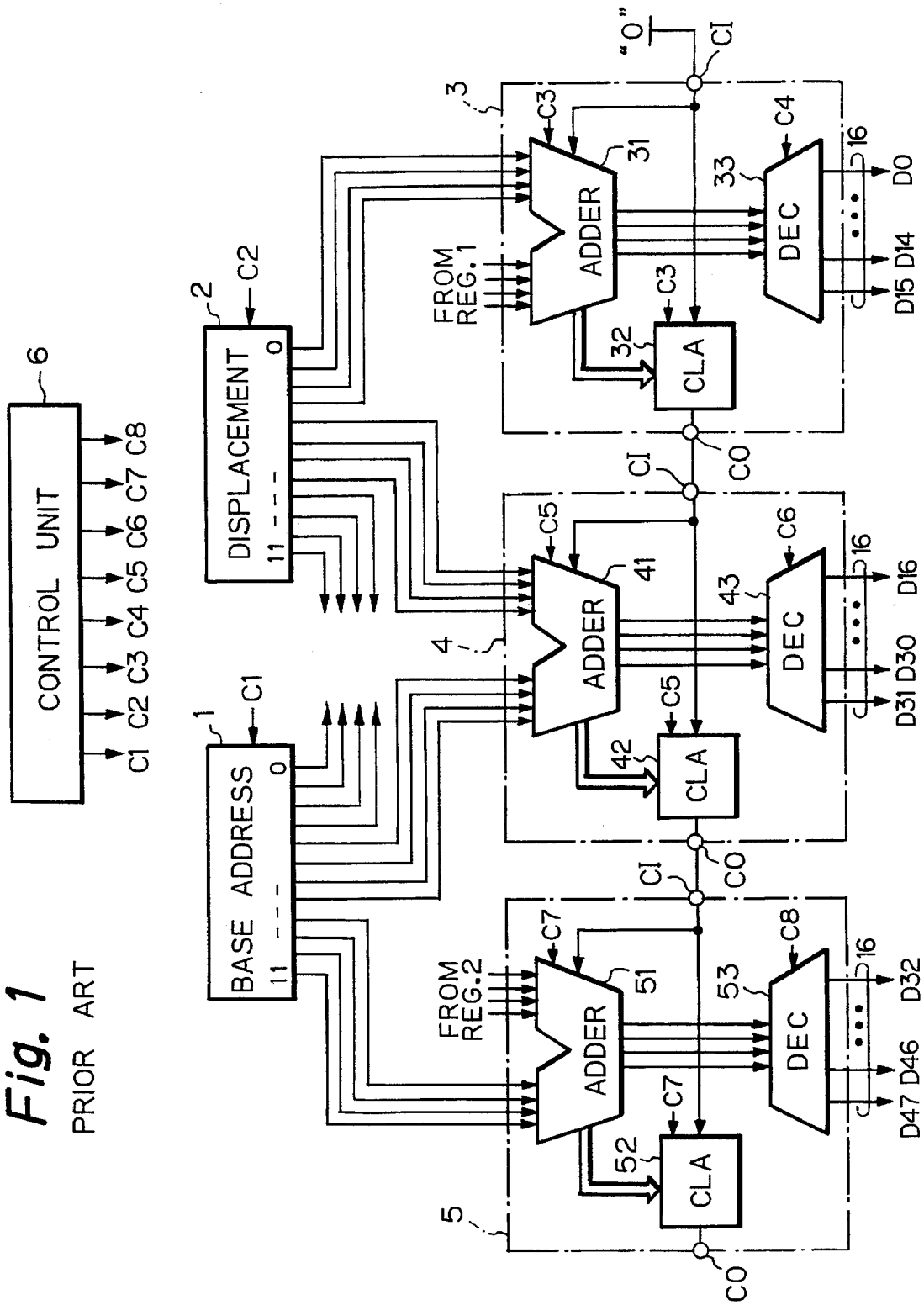
FIG. 1 is a circuit diagram illustrating a prior art address generating and decoding apparatus.

In FIG. 1, which illustrates a prior art address generating and decoding apparatus, reference numeral 1 designates a base address register for storing a 12-bit base address, and 2 designates a displacement register for storing a 12-bit displacement. In this case, the base address and the displacement are both fixed point numbers. The base address register 1 and the displacement register 2 are connected to three partial decoding signal generating units 3, 4 and 5. That is, bits 0 to 3 of the base address and bits 0 to 3 of the displacement are supplied to the partial decoding signal generating unit 3, bits 4 to 7 of the base address and bits 4 to 7 of the displacement are supplied to the partial decoding signal generating unit 4, and bits 8 to 11 of the base address and bits 8 to 11 of the displacement are supplied to the partial decoding signal generating unit 5.

Each of the partial decoding signal generating units 3 (4, 5) includes an adder 31 (41, 51), a carry look ahead circuit 32 (42, 52), and a decoder 33 (43, 53)

That is, the adder such as 31 adds bits 0 to 3 of the displacement and data at a carry input terminal CI to bits 0 to 3 of the base address, to generate a 4-bit sum signal. This 4-bit sum signal is decoded by the decoder 33 which, in turn, generates a 16-bit partial decoding signal. The carry look ahead circuit 32 is operated simultaneously with the operation of the adder 31, to generate a carry signal at a carry output terminal CO.

For example, the partial decoding signal represented by D16 to D31 of the partial decoding signal generating unit 4 and the partial decoding signal represented by D32 to D47 of the decoding signal generating unit 4 are supplied to a second decoder for selecting one word line in the MSU (not shown). On the other hand, the partial decoding signal represented by D0 to D15 of the decoding signal generating unit 3 is supplied directly to an X selector of the MSU (not shown). Such a hierarchical decoding system can reduce a decoding time period and an area of the decoders.

Also, in FIG. 1, reference numeral 6 designates a control unit for controlling the entire of the apparatus of FIG. 1.

The operation of the apparatus of FIG. 1 is explained next with reference to FIGS. 2A through 2H.

Figure 2:
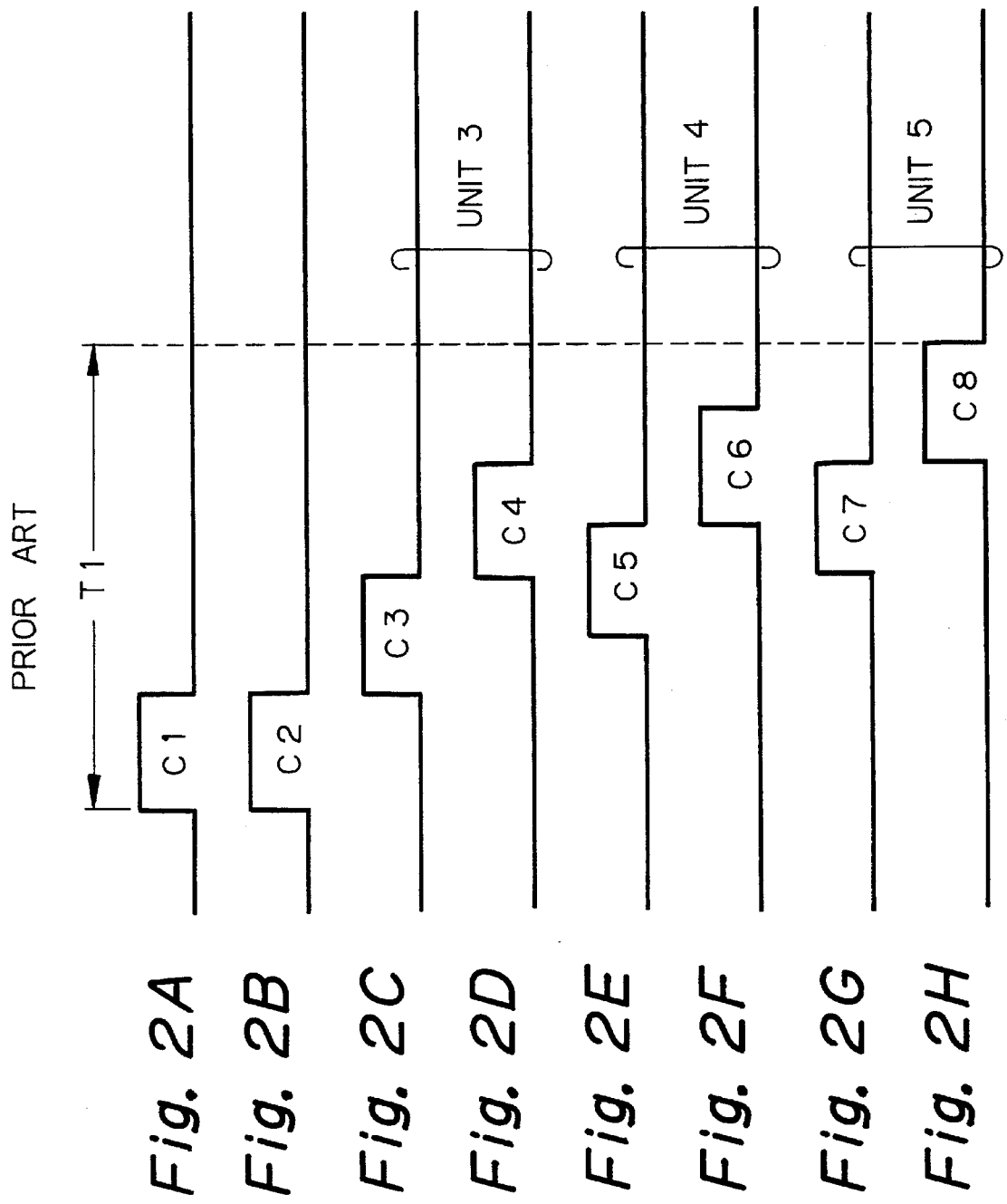
FIGS. 2A through 2H are timing diagrams showing the operation of the apparatus of FIG. 1.

As shown in FIG. 2A, the control unit 6 generates a control signal C1 to store a 12-bit base address in the base address register 1. Also, as shown in FIG. 2B, the control unit 6 generates a control signal C2 to store a 12-bit displacement in the displacement register 2. Note that the control signals C1 and C2 are simultaneously generated, however, these signals C1 and C2 can be generated at different timings.

Next, as shown in FIG. 2C, the control unit 6 generates a control signal C3 to operate the adder 31 as well as the carry look ahead circuit 32. As a result, the adder 31 performs addition upon the bits 0 to 3 of the base address, the bits 0 to 3 of the displacement, and the data at the carry input terminal CI of the unit 3 which is, in this case, "0". Simultaneously, the carry look ahead circuit 32 calculates a carry in advance of the completion of the operation of the adder 31, to generate a carry at the carry output terminal CO of the unit 3.

Next, as shown in FIG. 2D, the control unit 6 generates a control signal C4 to operate the decoder 33 to generate the partial decoding signal represented by D0 to D15.

Next, as shown in FIG. 2E, the control unit 6 generates a control signal C5 to operate the adder 41 as well as the carry look ahead circuit 42. Note that the generation of the control signal C5 is a little earlier than that of the control signal C4 due to the presence of the carry look ahead circuit 32. As a result, the adder 41 performs addition upon the bits 4 to 7 of the base address, the bits 4 to 7 of the displacement, and the data at the carry input terminal CI of the unit 4. Simultaneously, the carry look ahead circuit 42 calculates a carry in advance of the completion of the operation of the adder 41, to generate a carry at the carry output terminal CO of the unit 4.

Next, as shown in FIG. 2F, the control unit 6 generates a control signal C6 to operate the decoder 43 to generate the partial decoding signal represented by D16 to D31.

Next, as shown in FIG. 2G, the control unit 6 generates a control signal C7 to operate the adder 51 as well as the carry look ahead circuit 52. Note that the generation of the control signal C7 is a little earlier than that of the control signal C6 due to the presence of the carry look ahead circuit 42. As a result, the adder 51 performs addition upon the bits 8 to 11 of the base address, the bits 8 to 11 of the displacement, and the data at the carry input terminal CI of the unit 5. Simultaneously, the carry look ahead circuit 52 calculates a carry in advance of the completion of the operation of the adder 51, to generate a carry at the carry output terminal CO of the unit 5.

Finally, as shown in FIG. 2H, the control unit 6 generates a control signal C8 to operate the decoder 53 to generate the partial decoding signal represented by D32 to D47.

Note that, in this case, the carry data at the carry output terminal C0 of the unit 5 is meaningless.

Thus, as shown in FIGS. 2A through 2H, the operation of the partial decoding signal generating unit 4 is carried out after the operation of the partial decoding signal generating unit 3 is carried out, and the operation of the partial decoding signal generating unit 5 is carried out after the operation of the partial decoding signal generating unit 4 is carried out. Therefore, an operation time period T1 of the apparatus of FIG. 1 for one address generating and decoding operation is large, and therefore, the operation speed of the apparatus of FIG. 1 is low.

Figure 3:
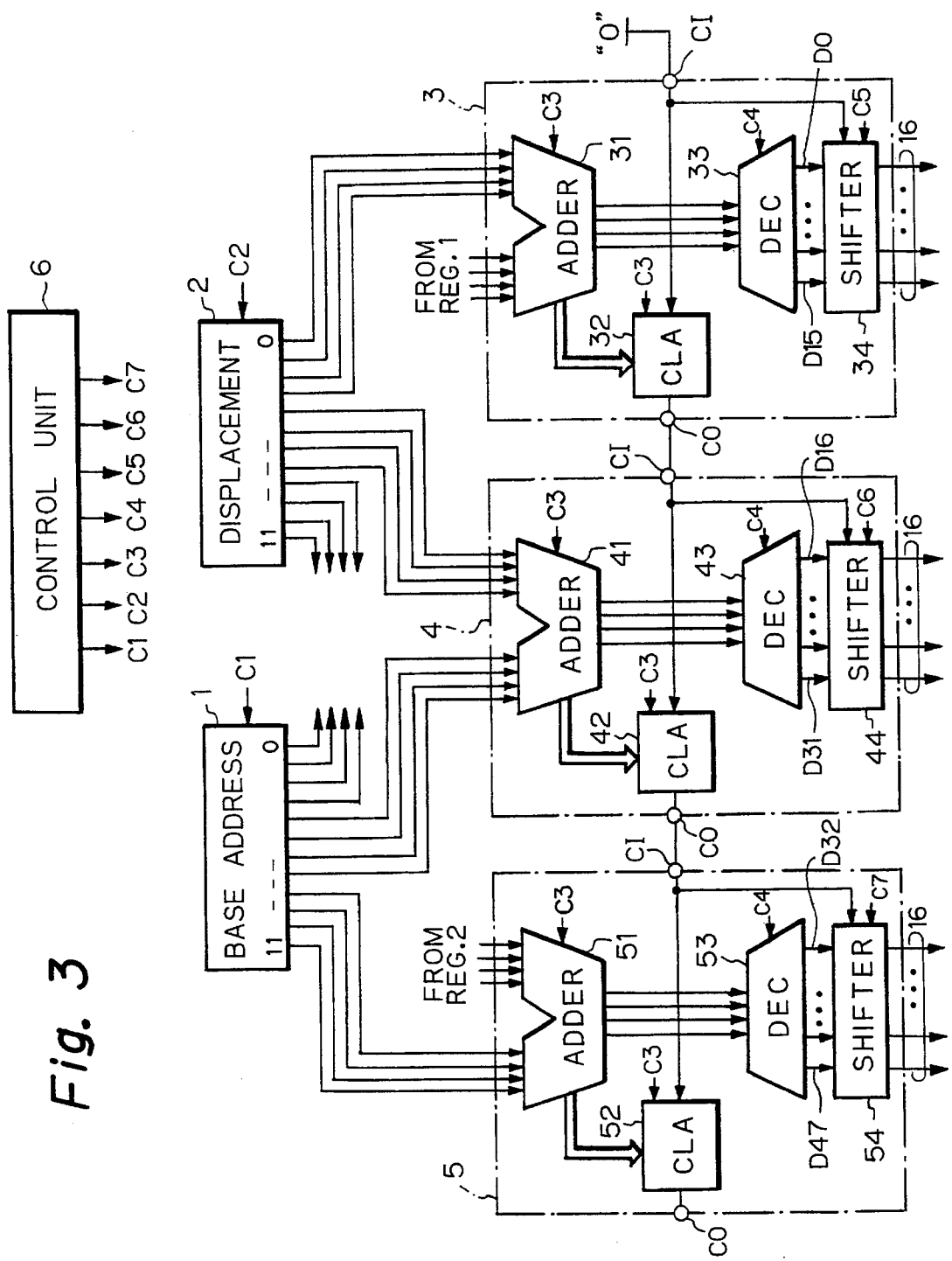
FIG. 3 is a circuit diagram illustrating an embodiment of the address generating and decoding apparatus according to the present invention.

In FIG. 3, which illustrates an embodiment of the present invention, shifters 34, 44 and 54 are added to the partial decoding signal generating units 3, 4 and 5, respectively, of FIG. 1. Also, the carry input terminal CI is not connected to the adder 31 (41, 42), and therefore, an addition operation is carried out at the adder 31 (41, 42) only between a part of the base address and a part of the displacement. Further, the shifters 34, 44 and 54 are controlled by the carry data at the carry input terminals CI of the units 3, 4 and 5, respectively.

Figure 4:
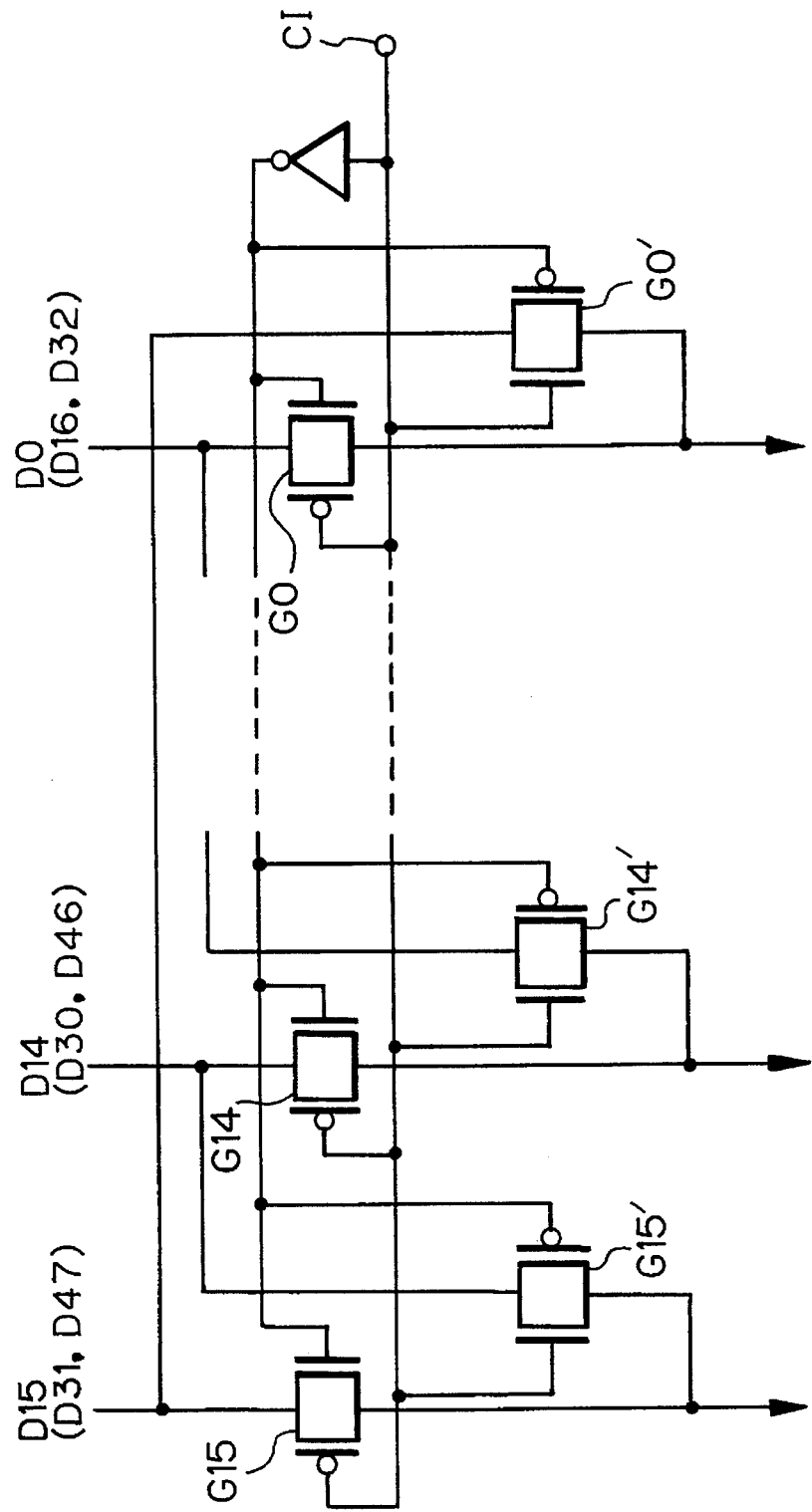
FIG. 4 is a circuit diagram of the shifter of FIG. 3.

In FIG. 4, which is a circuit diagram of the shifter 34 (44, 54) of FIG. 3, complementary metal oxide semiconductor (CMOS) transfer gates G0, . . . , G14 and G15 and CMOS transfer gates G0', . . . , G14' and G15' controlled by the carry data at the carry input terminal CI are provided. That is, when the carry data at the carry input terminal CI is "0" (low), the transfer gates G0, . . . , G14 and G15 are turned ON and the transfer gates G0', . . . , G14' and G15' are turned OFF. As a result, the data D0, . . . , D14 and D15 pass through the shifter 34. Contrary to this, when the carry data at the carry input terminal CI is "0" (high), the transfer gates G0, , G14 and G15 are turned OFF and the transfer gates G0', . . . , G14' and G15' are turned ON. As a result, the data D0, . . . , D14 and D15 are left-shifted by one bit in the shifter 34.

The operation of the apparatus of FIG. 3 is explained next with reference to FIGS. 5A through 5G.

As shown in FIG. 5A, the control unit 6 generates a control signal C1 to store a 12-bit base address in the base address register 1. Also, as shown in FIG. 5B, the control unit 6 generates a control signal C2 to store a 12-bit displacement in the displacement register 2. Also, note that, the control signals C1 and C2 are simultaneously generated, however, these signals C1 and C2 can be generated at different timings.

Next, as shown in FIG. 5C, the control unit 6 generates a control signal C3 to operate all of the adders 31, 41 and 51 as well as all of the carry look ahead circuits 32, 42 and 52. As a result, the adder 31 performs addition upon the bits 0 to 3 of the base address and the bits 0 to 3 of the displacement. Simultaneously, the carry look ahead circuit 32 calculates a carry in advance of the completion of the operation of the adder 31, to generate a carry at the carry output terminal CO of the unit 3. Also, the adder 41 performs an addition upon the bits 4 to 7 of the base address and the bits 4 to 7 of the displacement. Simultaneously, the carry look ahead circuit 42 calculates a carry in advance of the completion of the operation of the adder 41, to generate a carry at the carry output terminal CO of the unit 4. Further, the adder 51 performs addition upon the bits 8 to 11 of the base address and the bits 8 to 11 of the displacement. Simultaneously, the carry look ahead circuit 52 calculates a carry in advance of the completion of the operation of the adder 51, to generate a carry at the carry output terminal CO of the unit 5.

Next, as shown in FIG. 5D, the control unit 6 generates a control signal C4 to operate all of the decoders 33, 43 and 53 to generate the partial decoding signal represented by D0 to D15, the partial decoding signal represented by D16 to D31, and the partial decoding signal represented by D32 to D47.

Finally, as shown in FIGS. 5E, 5F and 5G, the control unit 6 generates control signals C5, C6 and C7, sequentially, so that the partial decoding signal represented by D0 to D15 (D16 to D31, D32 to D47) is shifted in the shifter 34 (44, 54) in accordance with the carry data at the carry input terminal CI of the unit 3 (4, 5).

Thus, as shown in FIGS. 5A through 5D, all of the operations of the partial decoding signal generating units 3, 4 and 5 are carried out simultaneously with the propagation of carry data. Therefore, an operation time period T2 of the apparatus of FIG. 3 for one address generating and decoding operation is small, and therefore, the operation speed of the apparatus of FIG. 3 is high.

In the above-described embodiment, the number of partial decoding signal generating units is three; however, the present invention can be applied to an address generating and decoding apparatus having two partial decoding signal generating units, or four or more partial decoding generating units. Also, the number of bits per one partial decoding signal generating unit can be arbitrary. Further, the address generating and decoding apparatus of FIG. 3 can be operated without the control signals C3 through C7.

As explained hereinbefore, according to the present invention, since a plurality of partial decoding signal generating units can be operated simultaneously with the propagation of carry data, the operation speed can be increased.

I claim:

1. An apparatus for generating first and second addresses into a third address and decoding the third address, comprising:

a first register for storing the first address;

second register for storing the second address; and a plurality of partial decoding signal generating units, connected to said first and second registers, for generating partial decoding signals, each of said partial decoding signal generating units comprising:

a carry input terminal;

a carry output terminal;

an adder, connected to said first and second registers, for adding a part of the first address to a part of the second address, to generate a partial third address;

a carry look ahead circuit, connected to said adder and said carry input terminal, for generating a carry at said carry output terminal in accordance with data at inputs of said adder and data at said carry input terminal;

a decoder, connected to said adder, for decoding the partial third address to generate one of the partial decoding signals; and a shifter, connected to said decoder and said carry input termional, for shifting the one of the partial decoding signals in accordance with the data at said carry input signal, said carry output terminal of one of said partial decoding signal generating units being connected to said carry input terminal of another of said partial decoding signal units.

2. An apparatus as set forth in claim 1, further comprising a control unit, connected to said partial decoding signal generating units, for operating said partial decoding signal generating units simultaneously.

3. An apparatus as set forth in claim 1, further comprising a control unit, connected to said partial decoding signal generating units, for operating said adders and said carry look ahead circuits of said partial decoding signal generating units simultaneously, and operating said decoders of said partial decoding signal generating units simultaneously.

4. An apparatus for generating a plurality of partial decoding signals comprising a plurality of partial decoding signal generating units, each comprising:

a carry input terminal;

a carry output terminal;

an adder, for adding a first fixed-point number to a second fixed point number, to generate a partial address;

a carry look ahead circuit, connected to said adder and said carry input terminal, for generating a carry at said carry output terminal in accordance with said first and second fixed-point numbers, and data at said carry input terminal;

a decoder, connected to said adder, for decoding the partial real address to generate one of the partial decoding signals; and a shifter, connected to said decoder and said carry input terminal, for shifting the one of the partial decoding signals in accordance with the data at said carry input signal, said carry output terminal of one of said partial decoding signal generating units being connected to said carry input terminal of another of said partial decoding signal units.

5. An apparatus as set forth in claim 4, further comprising a control unit, connected to said partial decoding signal generating units, for operating said partial decoding signal generating units simultaneously.

6. An apparatus as set forth in claim 4, further comprising a control unit, connected to said partial decoding signal generating units, for operating said adders and said carry look ahead circuits of said partial decoding signal generating units simultaneously, and operating said decoders of said partial decoding signal generating units simultaneously.

* * * * *